(12) United States Patent
Glaser et al.

(10) Patent No.: US 6,292,344 B1
(45) Date of Patent: *Sep. 18, 2001

(54) FLOATING GROUND ISOLATOR FOR A COMMUNICATIONS CABLE LOCATING SYSTEM

(75) Inventors: Ronald W. Glaser, Ector; James A. Glaser, Bonham, both of TX (US)

(73) Assignee: Act Communications, Inc., Bonham, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/923,229

(22) Filed: Sep. 4, 1997

Related U.S. Application Data

(63) Continuation of application No. 08/483,085, filed on Jun. 7, 1995, now Pat. No. 5,721,662, which is a continuation-in-part of application No. 07/921,084, filed on Jul. 29, 1992, now abandoned.

(51) Int. Cl.[7] .................................................... H01C 7/12
(52) U.S. Cl. ................................ 361/119; 361/111
(58) Field of Search .................................... 361/111, 115, 361/119, 113, 56; 324/512, 525, 528; 174/78

(56) References Cited

U.S. PATENT DOCUMENTS

| | | | |
|---|---|---|---|
| 3,668,640 | * 6/1972 | Driscoll | 340/825.49 |
| 4,021,759 | * 5/1977 | Campi | 333/182 |
| 4,023,071 | * 5/1977 | Fussell | 361/56 |
| 4,262,317 | * 4/1981 | Baumbach | 361/119 |
| 5,122,921 | * 6/1992 | Koss | 361/111 |
| 5,136,455 | 8/1992 | Billingsley | 361/56 |
| 5,224,878 | * 7/1993 | Lurie et al. | 439/620 |
| 5,721,662 | * 2/1998 | Glaser et al. | 361/119 |

* cited by examiner

*Primary Examiner*—Ronald W. Leja
(74) *Attorney, Agent, or Firm*—Carr & Storm, L.L.P.

(57) ABSTRACT

A floating ground isolator for shunting only selected damaging and/or annoying induced energy from a communications cable sheath to ground, thereby facilitating long range cable location using conventional signal radiation techniques. The floating ground isolator provides a surge suppression circuit to effectively suppress dangerous transient surges present on the cable sheath and a filtering circuit to pass annoying periodic signals within a preselected frequency range from the cable sheath to ground. A selectively connected terminating resistance is also provided between the cable sheath and ground to form a side leg termination useful in facilitating long range cable location on spurs emanating from a main cable line. Furthermore, a relay controlled floating ground circuit is disclosed having a normal position shunting the cable sheath to ground and an actuated position lifting the ground connection.

47 Claims, 7 Drawing Sheets

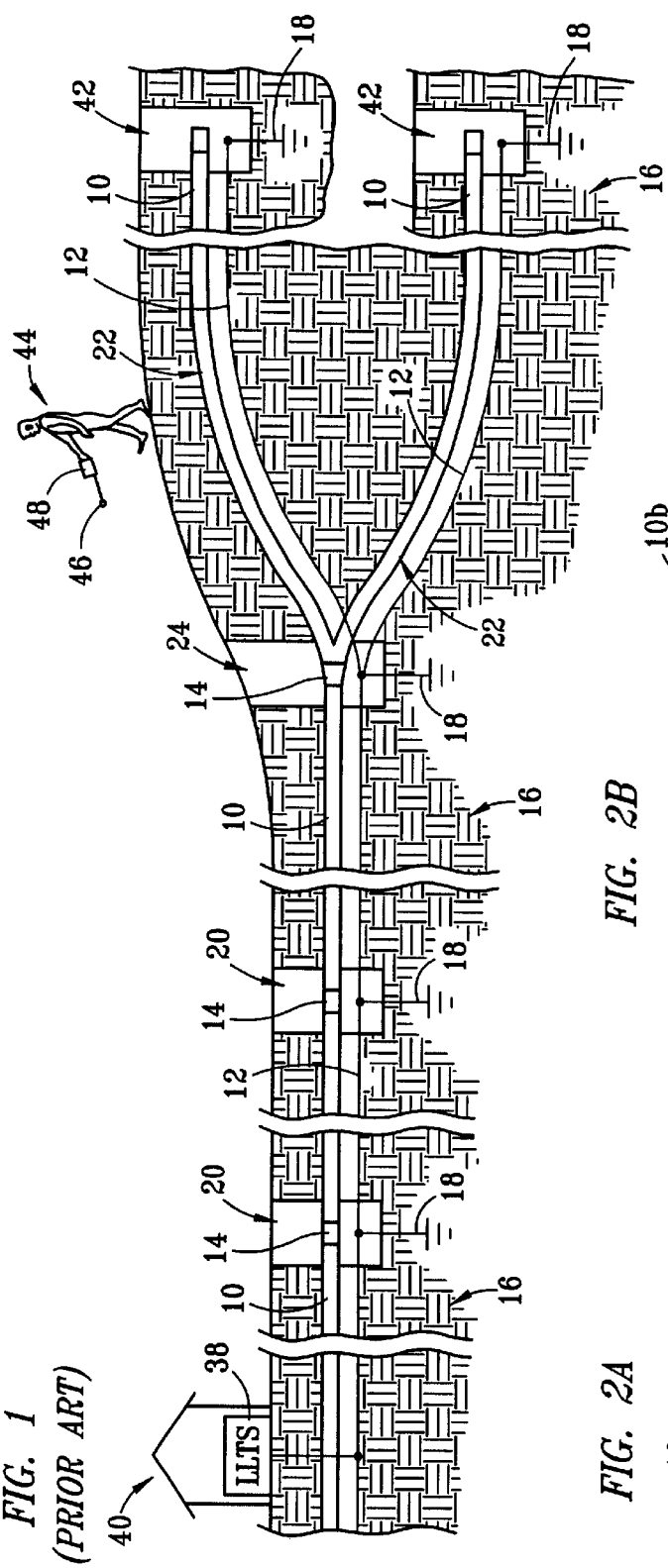
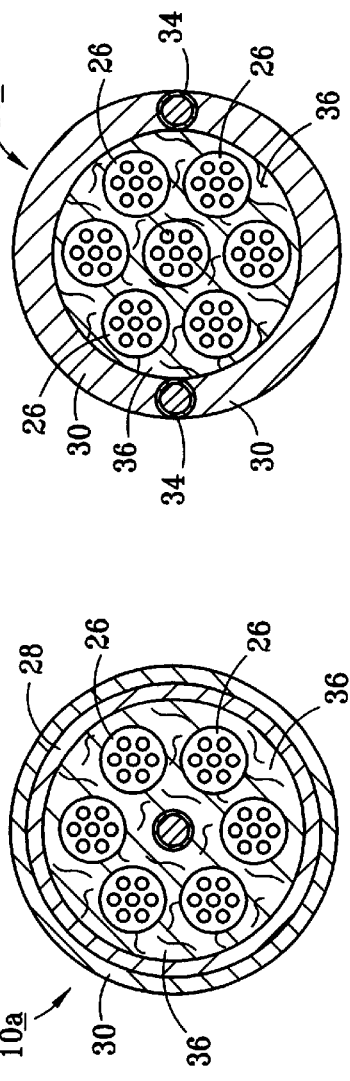
FIG. 1 (PRIOR ART)
FIG. 2A
FIG. 2B

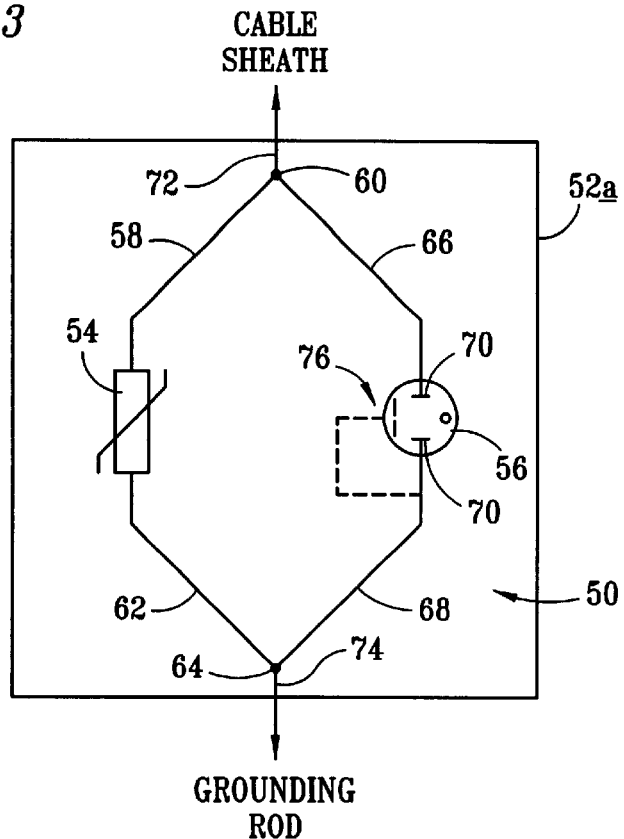
FIG. 3
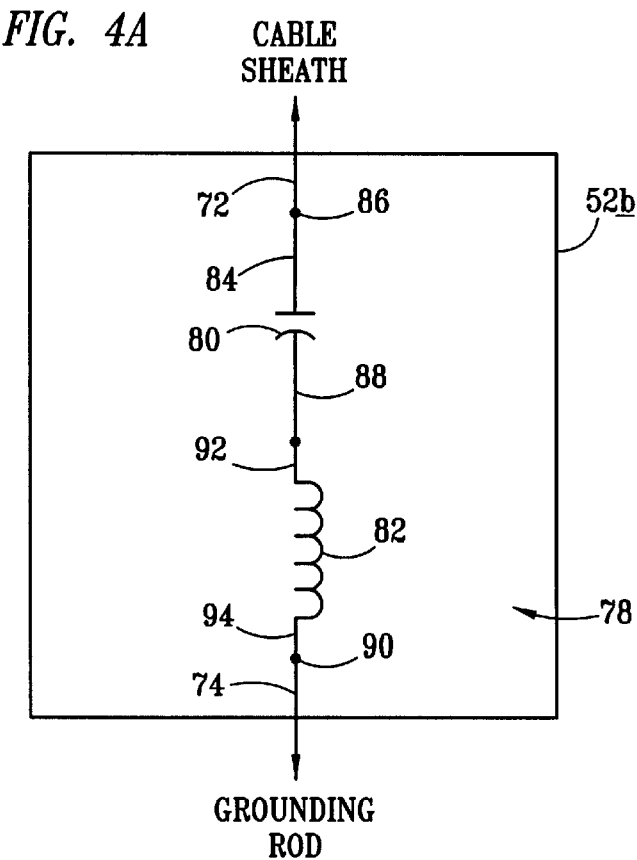
FIG. 4A
FIG. 4B

FLOATING GROUND ISOLATOR FOR A COMMUNICATIONS CABLE LOCATING SYSTEM

This application is a continuation of U.S. Pat. No. 5,721,662, formerly co-pending patent application Ser. No. 08/483,085, to James A. Glaser and Ronald W. Glaser, entitled "A FLOATING GROUND ISOLATOR FOR A COMMUNICATIONS CABLE LOCATING SYSTEM," filed Jun. 7, 1995, and issued Feb. 24, 1998, which was a continuation-in-part of formerly patent application Ser. No. 07/921,084, filed Jul. 29, 1992, now abandoned.

TECHNICAL FIELD

The present invention relates to communications cable locating systems and, in particular, to a floating ground isolator for connection to a communications cable sheath to facilitate cable locating activities.

BACKGROUND OF THE INVENTION

It is imperative that communications cables be grounded to discharge damaging and/or annoying induced energy resulting from transient surges (caused by lightning, transient voltages and power crosses), periodic signals (such as sixty cycle interference from power lines) and other known causes. Conventional cable sheath grounding methods require a fixed electrical connection at selected locations (typically at cable splice points) between the cable sheath and earth ground. Grounding of the cable sheath at each splice point provides a plurality of signal paths for bleeding off induced energy present on the sheath and protecting the cable and associated communications equipment from damage and interference.

With buried communications cables, however, facilitating long range cable locating using conventional signal radiating techniques is equally imperative to protecting the cable from induced energy. In the conventional locating method, a locating signal is transmitted along the length of the cable sheath. The cable sheath functions as an antenna radiating the transmitted locating signal through the earth for subsequent surface detection. The strength of the received radiated signal gives an indication of the approximate location of the buried communications cable.

Fixed grounding of the communications cable sheath as described above, however, precludes long range cable locating using conventional signal radiating techniques because the locating signal transmitted on the cable sheath will be shunted to ground at the first cable splice point encountered along the length of the cable. Thus, to enable long range cable locating, the ground connection at each splice point must be disconnected (lifted) by cable maintenance personnel to allow the locating signal to propagate along the entire length of the communications cable. Over the course of a thirty to sixty mile length of communications cable, it becomes prohibitively inconvenient, inefficient and expensive to have the ground connection lifted at each one of dozens of splice points.

Of further concern with respect to long range cable locating is the difficulty experienced with locating communications cables on side legs (or spurs) emanating from a main communications cable. Due to the potential differences in impedance of the sheath caused by differences in side leg lengths, it is likely that the cable locating signal will propagate at different, sometimes insufficient strengths, down each side leg. If the locating signal has insufficient signal strength, radiation from the sheath and surface detection may become difficult or impossible, thus adversely affecting the accuracy of the cable locating activity.

SUMMARY OF THE INVENTION

The present invention comprises a floating ground isolator for protecting a communications cable sheath from induced energy while simultaneously facilitating cable locating using conventional signal radiating techniques. The floating ground isolator includes circuit means for providing a connection to ground for shunting selected damaging and/or annoying induced energy signals from the cable sheath. The use of the term "floating" refers to the fact that the circuit means of the floating ground isolator also simultaneously presents an open circuit (lifting or floating the hardwired ground connection) with respect to certain selected signals on the cable sheath, for example, a transmitted cable locating signal. Thus, with the floating ground isolator of the present invention, cable protection and cable locating services are efficiently provided in a simultaneous manner, thus obviating the need for lifting of sheath ground connections at each splice point prior to engaging in cable locating activities.

In one embodiment of the present invention, the floating ground isolator comprises a surge protection circuit that functions to shunt transient surges on the sheath exceeding a threshold voltage to ground. With respect to any other signal present on the sheath, including the cable locating signal and surges below the threshold, the ground connection through the surge protection circuit "floats" to effectively present an open circuit. The surge protection circuit preferably comprises a metal oxide varistor ("MOV") and gas tube connected in parallel between the cable sheath and ground.

In another embodiment of the present invention, the floating ground isolator comprises a bandpass filter circuit that functions to shunt periodic signals on the sheath that are within a predetermined bandpass frequency response to ground. With respect to any other signal present on the sheath, including the cable locating signal, transient surges and those periodic signals outside the bandpass frequency, the ground connection through the filter circuit "floats" to effectively present an open circuit. The filter circuit preferably comprises an inductor connected in series with a capacitor between the cable sheath and ground.

Because the filter circuit cannot function to protect the communications cable from damage due to transient surges, in yet another embodiment of the present invention, the floating ground isolator comprises the filter circuit connected in parallel with the surge protection circuit. Thus, periodic signals within the bandpass response and transient surges exceeding the acceptable voltage threshold on the cable sheath will be shunted to ground. With respect to any other signal present on the sheath, including the cable locating signal, the ground connection "floats" to effectively present an open circuit.

In yet another embodiment of present invention, the floating ground isolator further includes variable impedance means connected between the cable sheath and ground for use at cable termination points on side legs. The variable impedance compensates for the differences in impedance encountered with side lengths of varying lengths. By adjusting the variable impedance, the strength of the cable locating signal propagating down each side leg is adjusted to enable surface detection and locating of the cable using conventional techniques.

BRIEF DESCRIPTION OF THE DRAWINGS

A more complete understanding of the floating ground isolator of the present invention may be had by reference to the following Detailed Description when taken in conjunction with the accompanying Drawings wherein:

FIG. 1 illustrates a buried communications cable and the prior art sheath grounding system that interferes with locating buried communications cable using conventional signal radiating techniques;

FIGS. 2A and 2B are cross sectional views of an armored communications cable and a non-armored communications cable, respectively;

FIG. 3 is a schematic diagram illustrating a surge suppression circuit of the present invention;

FIGS. 4A and 4B are a schematic diagram illustrating a filter circuit of the present invention and a frequency response characteristic;

DETAILED DESCRIPTION OF THE DRAWINGS

Figure 5:
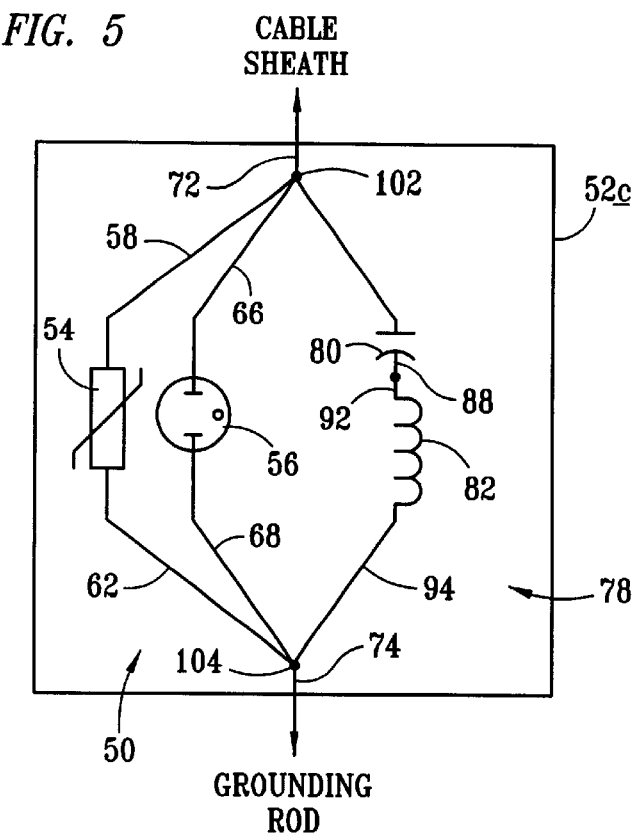
FIG. 5 is a schematic diagram illustrating a combination surge suppression circuit and filter circuit of the present invention.

FIG. 1 illustrates a buried communications cable 10 and the prior art grounding method of connecting the cable sheath 12 for the cable to earth ground 16. Due to the environment in which the cable 10 is located, the sheath is often subjected to induced energy signals that may damage the cable and associated communications equipment, or interfere with communications operations. In the prior art grounding method, a grounding rod 18 or other equivalent grounding means is connected to the sheath 12 at each cable splice point 14. The splice points 14 occur at locations 20 where two pieces of cable 10 are joined in series and at locations 24 where two or more branches (also referred to as spurs or side legs) 22 are joined. By grounding the sheath 12, the induced energy signals thereon are safely and effectively shunted to ground.

The cable sheath 12 is schematically shown in FIG. 1 as a single external conductor for ease of representation although it will, of course, be understood with reference to the cable cross-sectional views in FIGS. 2A and 2B, that the sheath is preferably within the cable 10. Each communications cable 10 includes a plurality of communications line bundles 26 (either copper or fiber optic). An armored communications cable 10a includes a the buried cable 10 must be disconnected (lifted) by cable maintenance personnel. If the ground connections are not lifted between a source location 40 and a termination location 42, the locating signal transmitted by the LLTS 38 will go to ground at the point where the sheath is grounded and will not propagate any further down the cable sheath 12. Thus, between the grounding point and the termination location 42, cable locating by locating personnel 44 will be impossible because there will be no radiation of the transmitted locating signal by the buried sheath 12.

Often times the distance between the source location 40 and termination location 42 is thirty to sixty miles and the cable stretching therebetween includes dozens of hardwired grounded splice points 14. While the prior art grounding system effectively functions to shunt undesirable induced energy to ground, the system is undesirable for convenience, efficiency and expense reasons due to the fact that maintenance personnel must travel to each of the dozens of slice points 14 and disconnect (lift) the connection to the grounding rod prior to the time any cable locating activities occur.

In view of the foregoing, there is a need for a ground isolator that will provide a floating ground connection to the cable sheath 12. The use of the term "floating" refers to the fact that a hardwired ground for shunting undesirable induced energy and an open circuit allowing propagation of the cable locating signal are simultaneously provided. With such an isolator, the prior art requirement for lifting each ground connection to enable propagation of the locating signal will be obviated without detrimentally affecting the necessary protection to be given the cable from induced energy such as transient surges and periodic interference signals.

Referring now to FIG. 3, there is shown a schematic diagram of a surge suppression circuit 50 of the present invention. The surge suppression circuit 50 is connected via leads 72 and 74 to the cable sheath 12 and grounding rod 18, respectively. In operation, the circuit 50 will suppress transient surges present on the cable sheath 12 by shunting the induced energy to the grounding rod 18 for dissipation when the voltage induced on the sheath by the surge exceeds a predetermined threshold. For all other types of induced energy on the sheath, including the transmitted locating signal, the circuit 50 is an open circuit and functions as a floating ground isolator 52a between the sheath 12 and the grounding rod 18. If the floating ground isolator 52a is connected at each splice point 14 (FIG. 1), protection from damaging induced energy and operation of long range cable locating activities are simultaneously facilitated.

The surge suppression circuit 50 preferably comprises a metal oxide varistor ("MOV") 54 connected in parallel with a gas tube 56. The MOV 54 has a first lead 58 connected to a first junction point 60 and a second lead 62 connected to a second junction point 64. The gas tube 56 has a first lead 66 connected to the first junction point 60 and a second lead 68 connected to the second junction point 64. Sheath connector lead 72 connects the first junction point 60, and the first leads 58 and 66 of the MOV 54 and gas tube 56, to the cable sheath 12 of a communications cable 10 (FIGS. 2A and 2B). Ground connector lead 74 connects the second junction point 64, and second leads 62 and 68 of the MOV 54 and gas tube 56, to the grounding rod 18 (FIG. 1) or other suitable ground.

The MOV 54 is a voltage sensitive device that will not shunt induced energy from the cable sheath 12 unless the voltage difference between the first junction point 60 (or cable sheath 12) and the second junction point 64 (or grounding rod 18) exceeds an MOV threshold voltage. Similarly, the gas tube 56 will not shunt induced energy unless the voltage difference between the first junction point 60 (cable sheath 12) and the second junction point 64 (grounding rod 18) exceeds a gas tube threshold voltage. The surge suppressor 50 thus functions as an open circuit "floating" the connection to the grounding rod 18 unless and until an induced energy signal on the cable sheath 12 is encountered having a voltage difference exceeding either the MOV threshold or gas tube threshold voltage.

Because the MOV 54 and gas tube 56 are both voltage sensitive shunting devices, there is some redundancy in the circuit 50. This redundancy, however, is necessitated by the following well known operational characteristics of the MOV 54 and gas tube 56 components. First, when an MOV 54 fails, it fails as a short circuit. When a gas tube 56 fails, on the other hand, it fails as a open circuit. Second, the more often and longer an MOV 54 operates to shunt an MOV threshold exceeding voltage (by conducting current from the sheath 12 to ground), the more quickly the device will degrade over time and eventually fail (as a short). Third, the MOV 54 clamps an MOV threshold exceeding voltage present on the cable sheath 12 to ground more quickly than the gas tube 56 will clamp a gas tube threshold exceeding voltage. Fourth, the gas tube 56 has significantly less capacitance (impedance) than the MOV 54. The gas tube 56 therefore will conduct a gas tube threshold exceeding voltage to ground more easily than the MOV 54 will conduct an MOV threshold exceeding voltage.

These device characteristics necessitate the use of both an MOV 54 and a gas tube 56 in the circuit 50 and are important factors in the choosing of the MOV and gas tube threshold voltages. With proper threshold selection, the timing of the activation of the MOV 54 and gas tube 56 to shunt transient surges exceeding the acceptable voltage threshold is controlled thereby protecting both the communications cable 10 and circuit 50 from transient surge damage. In accordance with the foregoing characteristics, if the MOV 54 fails, then the cable sheath 12 will be shorted to the grounding rod 18 bypassing the gas tube 56 and terminating the floating ground functionality of the circuit 50. Thus, it is imperative that the MOV 54 be protected from excessive use and potential failure by proper selection of the MOV and gas tube threshold voltages. For quick suppression of the initial surge, it is important that the circuit take advantage of the quicker response time of the MOV 54 by choosing the MOV to have a lower threshold voltage than the gas tube 56. It is, however, also important that the gas tube threshold voltage be close enough to the MOV threshold voltage to protect the MOV 54 from long exposure to voltage surges and currents.

Choosing the gas tube threshold voltage to be lower than the MOV threshold voltage is not preferable because the gas tube 56 takes a significantly longer time to react than the MOV 54. Thus, there is a chance that damage to the cable 10 from the induced surge could occur in the time prior to the instant the gas tube shunts the induced surge to the grounding rod 18. Accordingly, in the preferred embodiment of the circuit 50, the gas tube 56 has a close, but slightly higher, threshold voltage than the MOV 54, thereby advantageously using its reduced capacitance (impedance) factor to protect the MOV 54. Once the gas tube 56 is activated, the voltage surge will take the path of least resistance through the more resilient gas tube, rather than the delicate MOV, thereby protecting the MOV from damaging prolonged surge exposure.

The selection of the threshold voltages for the MOV 54 and the gas tube 56 depends on the selection of the desired life of the circuit 50 (i.e., the MOV device) in terms of number of fires (turn-ons) for a given surge waveform representative of the transient surges likely to be encountered when the circuit is connected to the cable sheath 12. From currently available generic MOV device specification information, the desired number of fires gives an MOV current and a rated MOV threshold voltage for the MOV 54. The desired gas tube threshold voltage is then selected to be slightly higher than the rated MOV threshold voltage. To obtain a gas tube 56 with the selected threshold voltage, several gas tubes having rated thresholds in the range of the selected threshold are hand tested until one having the proper threshold voltage is found.

For illustration of the foregoing, if the life of the surge suppressor 50 is desired to be one thousand fires (minimum) caused by an eight-by-twenty microsecond surge waveform, the generic MOV device specification information gives an MOV 54 having a current rating of two-hundred amps. According to the operating characteristics for a two-hundred amp MOV 54, the device will have a threshold voltage of, for example, two-hundred and seventy volts. Thus, the hand selected gas tube 56 must have a threshold voltage of at least two-hundred and seventy volts in order for the surge suppressor 50 to operate properly and efficiently in accordance with the present invention. Such voltage threshold selection for the components effectively protects the MOV 54 from prolonged exposure to high voltages and currents that may lead to premature device failure because the gas tube 56 will turn on during such an incident to clamp the voltage surge through the gas tube rather than through the MOV. Such selection further provides protection against initial transient surge damage to the cable 10 by having the quickly actuated MOV 54, rather than the slowly reacting gas tube 56, handle the initial surge.

Although the MOV 54 is illustrated in FIG. 3 as single device, it will, of course, be understood that two or more MOVs may be connected in series between the first and second junction points, 60 and 64, respectively. The use of multiple MOVs 54 having properly selected threshold voltages provides a more resilient circuit 50. Furthermore, although the gas tube 56 is illustrated as a two element 70 gas tube, it will, of course, be understood that a three element gas tube, as generally indicated by broken line 76, may be used in the surge suppression circuit 50. A three element gas tube 56 provides enhanced performance because the third element 76 provides an added discharging surface area connected to the grounding rod 18 for dissipating threshold exceeding surges.

Referring now to FIG. 4A, there is shown a schematic diagram of a filter circuit 78 of the present invention. The filter circuit 78 is connected via leads 72 and 74 to the cable sheath 12 and grounding rod 18. In operation, the circuit 78 will filter induced periodic signals present on the cable sheath 12 within a preselected frequency range to the grounding rod 18 for dissipation. For all other types of induced energy on the sheath, including the transmitted locating signal and any transient surges or signals outside the preselected frequency range, the circuit 78 is an open circuit and functions as a floating ground isolator 52b between the sheath 12 and the grounding rod 18. If the floating ground isolator 52b is connected at each splice point 14 (FIG. 1), removal of certain induced periodic signals and operation of long range cable locating on the cable sheath 12 are simultaneously facilitated.

The filter circuit 78 preferably comprises a capacitor 80 connected in series with an inductor (choke) 82. The capacitor 80 has a first lead 84 connected to a first junction point 86 and a second lead 88 connected to a first lead 92 of the inductor 82. The inductor further has a second lead 94 connected to the second junction point 90. The sheath connector lead 72 connects the first junction point 88, and the first lead 84 of the capacitor 80, to the cable sheath 12 of the communications cable 10. The ground connector lead 74 connects the second junction point 90, and the second lead 94 of the inductor 82, to the grounding rod 18.

The configuration of the capacitor 80 and inductor 82 in series provides a bandpass filter having a frequency response similar to that illustrated in FIG. 4B. The filter 78 will therefore pass periodic signals near a preselected center frequency f from the cable sheath 12 to the grounding rod 18. The center frequency f for the bandpass response is given by the following equation:

$$f = \frac{1}{2*\pi\sqrt{L*C}}$$

wherein:

L=the inductor 82 inductance in Henries; and

C=the capacitor 80 capacitance in Farads.

The sixty cycle interference induced on the cable sheath 12 by adjacent power lines is well known to adversely affect the cable locating operation. By proper choice of component values for the capacitor 80 and inductor 82 to tune the filter circuit 78 (for example, C=0.000006 F and L=1 H), a center frequency f approximately equal to sixty Hertz may be obtained to pass the power line induced interference signal to ground. For induced signals at all other frequencies, including the chosen frequency of the locating signal transmitted by the LLTS 38 and any transient surge signals, the filter circuit 78 appears as an open circuit and functions as a floating ground facilitating the cable locating operation. It will be understood that the center frequency f of the filter circuit 78 may be tuned by capacitor 80 and inductor 82 component selection to pass any selected range of frequencies for periodic signals induced on the cable sheath 12.

Referring now to FIG. 5, there is shown a schematic diagram of the surge suppression circuit 50 of the present invention connected in parallel with the filter circuit 78 of the present invention. The combined surge suppressor and filter circuit is connected via leads 72 and 74 to the cable sheath 12 and grounding rod 18. In operation, the combined circuits 50 and 78 will suppress voltage surges exceeding a threshold voltage and filter induced periodic signals within a preselected frequency range. For all other types of induced energy signals on the sheath, including the transmitted locating signal, the combined circuits 50 and 78 are an open circuit and function as a floating ground isolator 52c between the sheath 12 and the grounding rod 18. If the floating ground isolator 52c is connected at each splice point 14 (FIG. 1), suppression of damaging transient surges, removal of certain induced periodic signals and operation of long range cable locating on the cable sheath 12 are simultaneously facilitated.

In the floating ground isolator 52c, the first leads, 58, 66 and 84, of the MOV 54, gas tube 56 and capacitor 80, respectively, are connected to a first junction point 102. The second leads, 62, 68 and 94, of the MOV 54, gas tube 56 and inductor 82, respectively, are connected to a second junction point 104. The sheath connector lead 72 connects the first junction point 102, and first leads 58, 66 and 80, to the cable sheath 12 of the communications cable 10. The ground connector lead 74 connects the second junction point 104, and the second leads 62, 68 and 94, to the grounding rod 18.

Figure 6:
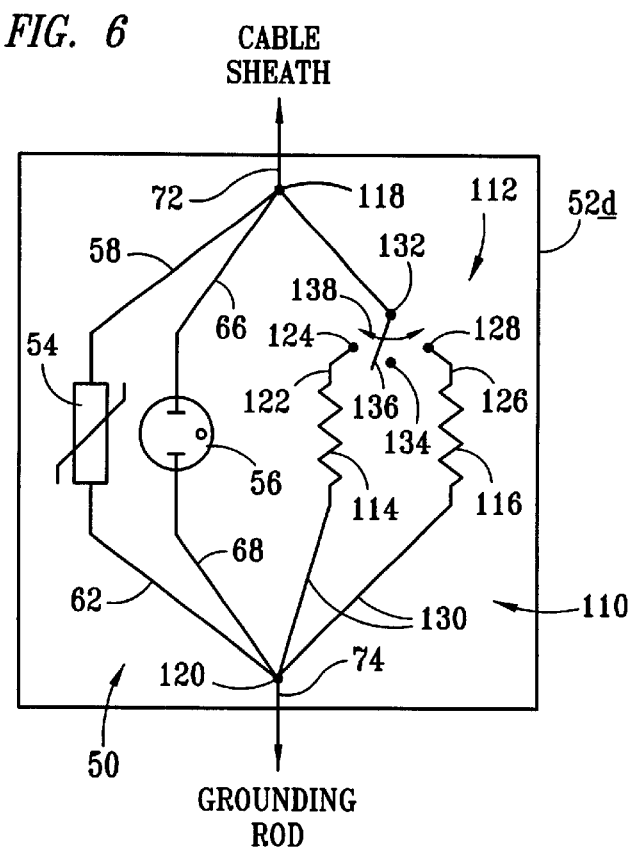
FIG. 6 is a schematic diagram illustrating the surge suppression circuit with a side leg termination circuit of the present invention.

Referring now to FIG. 6, there is shown a schematic diagram of the surge suppression circuit 50 of the present invention connected in parallel with a side leg termination circuit 110 of the present invention. The combined surge suppressor and side leg termination circuits 50 and 110 (referred to as floating ground isolator 52d) are connected via leads 72 and 74 to the cable sheath 12 and grounding rod 18. The operation of the surge suppression circuit 50 has been described in detail herein. The side leg termination circuit 110 allows maintenance personnel to select an impedance for connection between the sheath 12 and ground at the termination location 42 (FIG. 1) to facilitate, in a manner to be described, cable locating on side legs 22 emanating from a main communications cable.

When one or more spurs or side legs 22 branch from the communications cable 10, the cable locating signal transmitted on the cable sheath will be split into two or more parts. It is well known that electrical signals, like the locating signal, will take the path of least resistance. The strength of the locating signal propagating down each spur 22 therefore depends on, and is inversely proportional to, the effective impedance of the cable sheath 12 given by the product of the sheath inherent impedance and the sheath length. Thus, shorter length sheaths present a lower impedance than longer sheaths and following signal division, the locating signal propagating down a shorter length spur 22 will be stronger than the signal propagating down a longer length spur.

Often, the locating signal propagating down the longer spur 22 will not have sufficient strength to radiate through the earth for subsequent surface detection. The side leg termination circuit 110 of the present invention allows maintenance personnel to compensate for the differences in sheath impedance caused by side legs of different lengths by selecting an additional terminating resistance to be connected between the sheath 12 and ground. With proper selection of the terminating resistance provided by the circuit 110, maintenance personnel provide for a more equal division of the locating signal and insure that the divided locating signal has sufficient signal strength on each spur 22 to radiate above the surface of the earth for detection.

The side leg termination circuit 110 preferably comprises a three-way switch 112 along with two resistors, 114 and 116. The resistor 114 has a first lead 122 connected to a first contact 124 of the three-way switch 112. The resistor 116 has a first lead 126 connected to a second contact 128 of the three-way switch 112. The three-way switch further has a gate contact 132 connected to a first junction point 118, a third contact 134 that is open and a gate 136 moveable (arrow 138) to selectively electrically connect the gate contact to a selected one of the first, second or third contacts 124, 128 and 134, respectively. The resistors 114 and 116 each have a second lead 130 connected to a second junction point 120. The sheath connector lead 72 connects the first junction point 118 to the cable sheath 12 of the communications cable 10. The ground connector lead 74 connects the second junction point 120 to the grounding rod 18.

The floating ground isolator 52d further includes the first leads 58 and 66 of the MOV 54 and gas tube 56, respectively, connected to the first junction point 118. The second leads 62 and 68 of the MOV 54 and gas tube 56, respectively, are connected to a second junction point 120. In operation, the floating ground isolator 52d will suppress voltage surges exceeding a threshold voltage and provide a compensating spur terminating resistance. The impedances provided by the first and second resistors 114 and 116, respectively, are chosen to be different. For example, first resistor 114 may have a high impedance of five K-ohms and second resistor 116 may have a low impedance of one K-ohm. Thus, the three-way switch 112 of the side leg termination circuit 110 allows for the selection of an impedance (either high, low or open) to be connected between the cable sheath 12 and the grounding rod 18. When the switch 112 is set for the third contact 134 (open), the floating ground isolator 52d is equivalent to the isolator 52a (FIG. 3).

Figure 12:
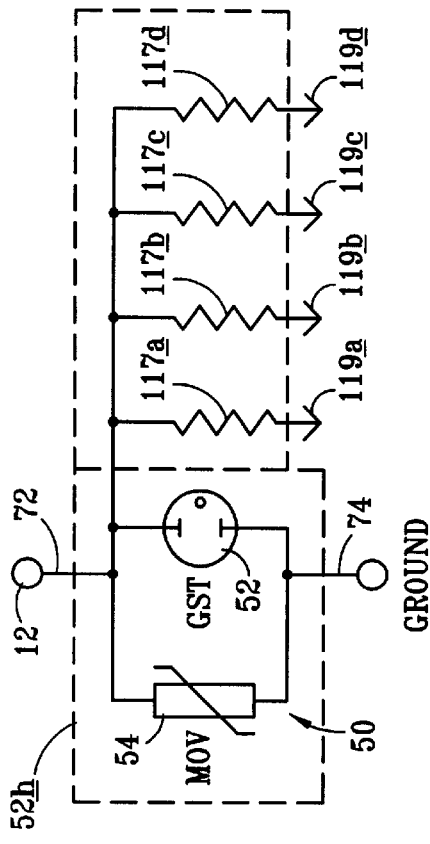
FIG. 12 is a schematic diagram illustrating a floating ground isolating circuit for use at the terminating end of a side leg.

Referring now to FIG. 12, where selection of the impedance or open circuit is not desired or needed, the switch may be eliminated from floating ground isolator 52d and only single resistor 115 used instead to form the side leg termination circuit 110. This arrangement is shown in floating ground isolator circuit 52g, which is, in all other respects, the same as floating ground isolator 52d.

Figure 13:
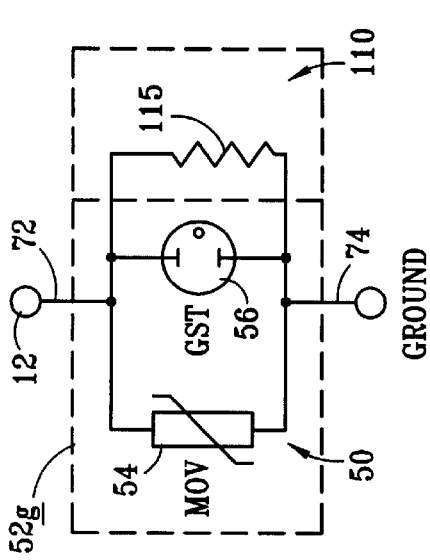
FIG. 13 is a schematic diagram illustrating a floating ground isolating circuit for discharging surges at a main cable while providing a floating ground on the main cable and side legs for passage of locating signals.

Referring now to FIG. 13, there is shown an alternate floating ground isolator circuit 52h useful where a floating ground isolator circuit is not used at a termination point of a side leg. Floating ground isolator circuit 52h includes four resistors 117a, 117b, 117c and 117d. Each resistor preferably has the same resistance. They are connected to sheath connector lead 72 in parallel with each other and to the surge suppression circuit 50. However, instead of being connected to ground connector lead 74, the side of each resistor opposite sheath connector lead 72 terminates with an electrical connector designated by arrow 119a, 119b, 119c and 119d, respectively. Each of these connectors and its corresponding resistor will be referred to as a customer drop.

Figure 14:
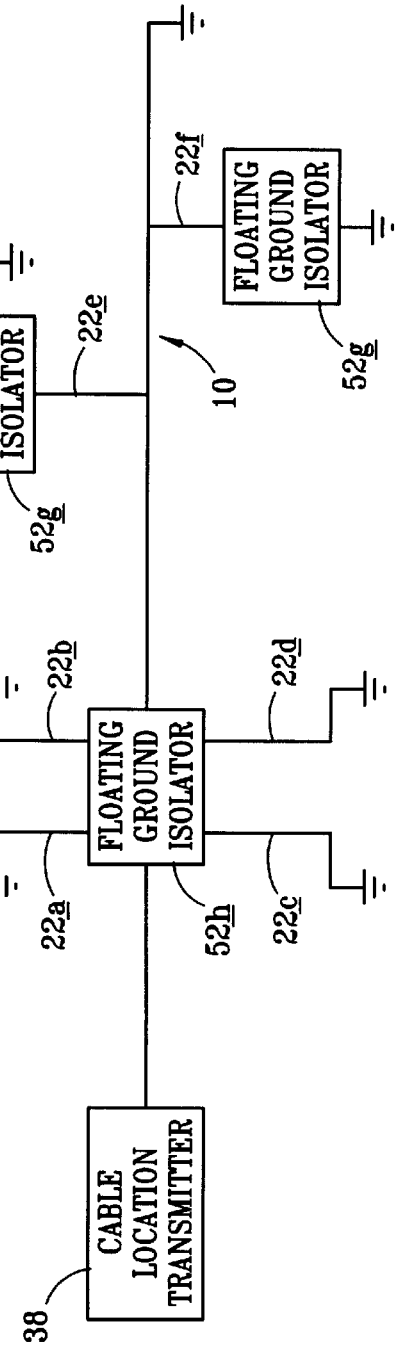
FIG. 14 is a schematic diagram illustrating a representative floating ground, fiber cable system having a main cable a plurality side legs and a surge suppression circuit connected to the main cable.

Referring to FIG. 14, schematically illustrated is a fiber optic cable 10 having a plurality of side legs or spurs 22a–22f. Each side leg terminates at a customer site. The sheath connector leads 72 (FIG. 12) of floating ground isolators 52g are connected to the cable sheath of the respective side legs 22e and 22f at the customer site where the side legs terminate.

Some customers prefer not to have, or cannot have, surge suppressors connected to ground at their sites which may function to divert lightning surges travelling from the main cable 10. Since the sheath of the side leg cables 22a–d are preferably connected at a customer site to hard ground, the sheaths of the side leg cables cannot then also be connected to the sheath of the main cable without all the energy of a cable locating signal sent by cable location transmitter 38 being diverted up the side legs and then to ground. The cable locating signal would not propagate further along the main cable toward the hard ground located at the end of the main cable opposite the cable location transmitter 38. Connecting floating ground isolators 52g to the main cable sheath would discharge surges. However, since the side leg could not be connected to the sheath, no location signals could travel along the side leg.

Floating ground isolator 52h addresses this problem and provides flexibility. It discharges lightning transients or surges at the main cable 10 while allowing a portion of the energy from locating signals on the main cable to travel out along side legs 22a–d without requiring use of an additional floating ground isolator at the end of the side leg terminating at the customer site.

The sheath connector lead 72 of the floating ground isolator 52h is connected to the sheath of the main fiber cable 10, as shown in FIG. 13. If the side legs 22a–22d are copper sheathed fiber cables, the sheath of each cable leg is connected to one of the plurality of connectors or customer drops 119a–d. If a side leg uses a dielectric fiber cable, an electrically conductive tracer wire or line is run adjacent to the fiber cable. The tracer line is connected to one of the drops 119a–d. The resistor 117 creates a voltage drop which causes a small portion of the current of the cable locating signal to flow out along the side leg to assist in locating the cable.

Providing a plurality of drops 119 from a single floating ground isolator package provides greater flexibility for cable installation. Additional side legs are easily added at the same point on the cable. Resistances for the additional drops are already matched to ensure that substantially the same amount of the current of cable locating signal travels up each side leg. However, rather than incorporating the resistances in the floating ground isolator package located at the main cable, they can be, if desired, inserted between ground and the sheath at the terminating end of each side leg 22a–d.

Figure 7:
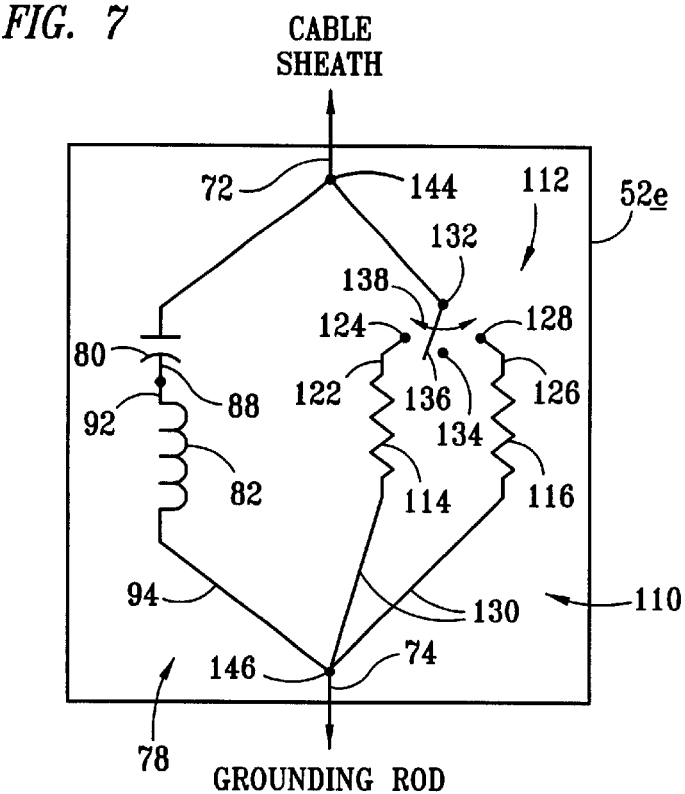
FIG. 7 is a schematic diagram illustrating the filter circuit and side leg termination circuit of the present invention.

Referring now to FIG. 7, there is shown a schematic diagram of the filter circuit 78 connected in parallel with the side leg termination circuit 110. The combined filter circuit 78 and side leg termination circuit 110 (collectively referred to as floating ground isolator 52e) are connected via leads 72 and 74 to the cable sheath 12 and grounding rod 18. The operation of the filter circuit 78 and side leg termination circuit 110 have been described in detail herein. In operation, the combined circuits 78 and 110 will filter induced periodic signals within a preselected frequency range and provide a compensating spur terminating resistance.

The floating ground isolator 52e includes the three-way switch 112 and two resistors, 114 and 116 of the side leg termination circuit 110. The first leads 122 and 126 of the resistors 114 and 116 are connected to the first and second contacts, 124 and 128, respectively, of the three-way switch 112. The gate contact 132 for the three-way switch is connected to a first junction point 144, with the third contact 134 open and the gate 136 moveable (arrow 138) to selectively electrically connect the gate contact to a selected one of the first, second or third contacts, 126, 128 and 134, respectively. The resistors 114 and 116 each have second leads 130 connected to a second junction point 146. The isolator 52e further includes the first lead 84 of the capacitor 80 connected to the first junction point 144. The second lead 94 of the inductor 82 is connected to the second junction point 146. The sheath connector lead 72 connects the first junction point 144 to the cable sheath 12 of the communications cable 10. The ground connector lead 74 connects the second junction point 146 to the grounding rod 18. When the switch 112 is set for the third contact 134 (open), the isolator 52e is equivalent to the isolator 52b (FIG. 4A).

Figure 8:
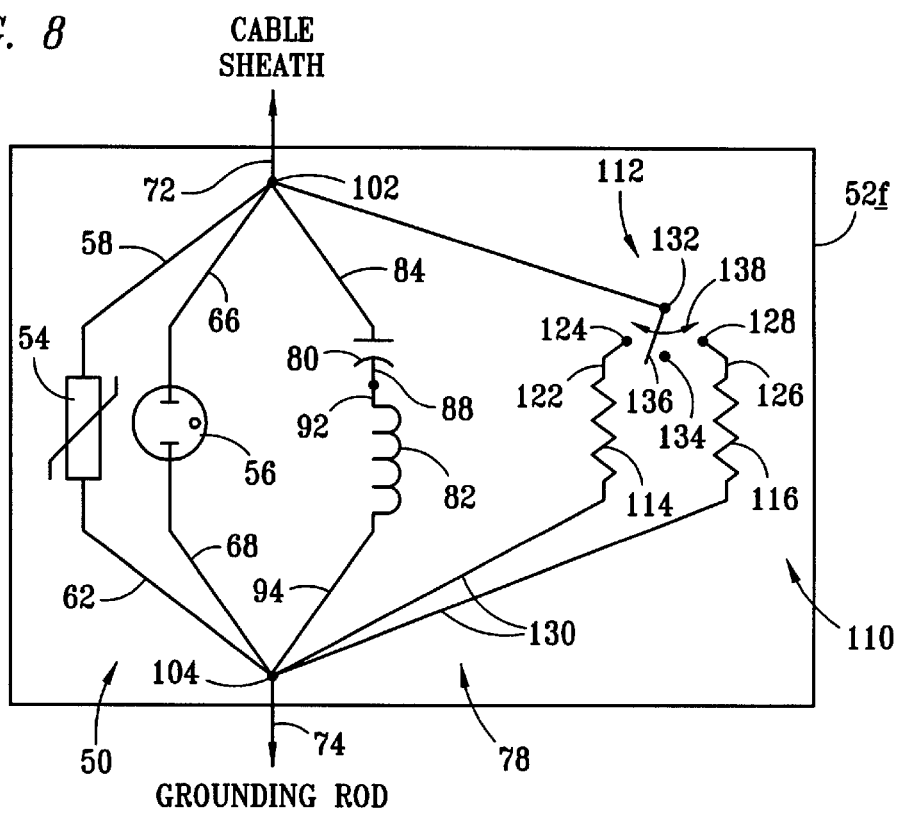
FIG. 8 is a schematic diagram illustrating the surge suppression circuit, filter circuit and side leg termination circuit of the present invention.

Referring now to FIG. 8, there is shown a schematic diagram of the surge suppression circuit 50 connected in parallel with the filter circuit 78 and the side leg termination circuit 110. The combined surge suppression circuit 50, filter circuit 78 and side leg termination circuit 110 (collectively referred to as floating ground isolator 52f) are connected via leads 72 and 74 to the cable sheath 12 and grounding rod 18. The operation of the surge suppression circuit 50, filter circuit 78 and side leg termination circuit 110 have been described in detail herein. In operation, the combined circuits 50, 78 and 110 will suppress voltage surges exceeding a threshold voltage, filter induced periodic signals within a preselected frequency range and provide a compensating spur terminating resistance.

The floating ground isolator 52f includes the three-way switch 112 and two resistors, 114 and 116 of the side leg termination circuit 110. The first leads 122 and 126 of the resistors 114 and 116 are connected to the first and second contacts, 124 and 128, respectively, of the three-way switch 112. The gate contact 132 for the three-way switch is connected to a first junction point 152, with the third contact 134 open and the gate 136 moveable (arrow 138) to selectively electrically connect the gate contact to a selected one of the first, second or third contacts, 126, 128 and 134, respectively. The resistors 114 and 116 each have second leads 130 connected to a second junction point 154.

The floating ground isolator 52f further includes the first leads 58, 66 and 84 of the MOV 54, gas tube 56 and capacitor 80, respectively, connected to the first junction point 152. The second leads 62, 68 and 94, of the MOV 54, gas tube 56 and inductor 82, respectively, are connected to the second junction point 154. The sheath connector lead 72 connects the first junction point 152 to the cable sheath 12 of the communications cable 10. The ground connector lead 74 connects the second junction point 154 to the grounding rod 18. When the switch 112 is set for the third contact 134 (open), the isolator 52f is equivalent to the isolator 52c (FIG. 5).

Figure 9:
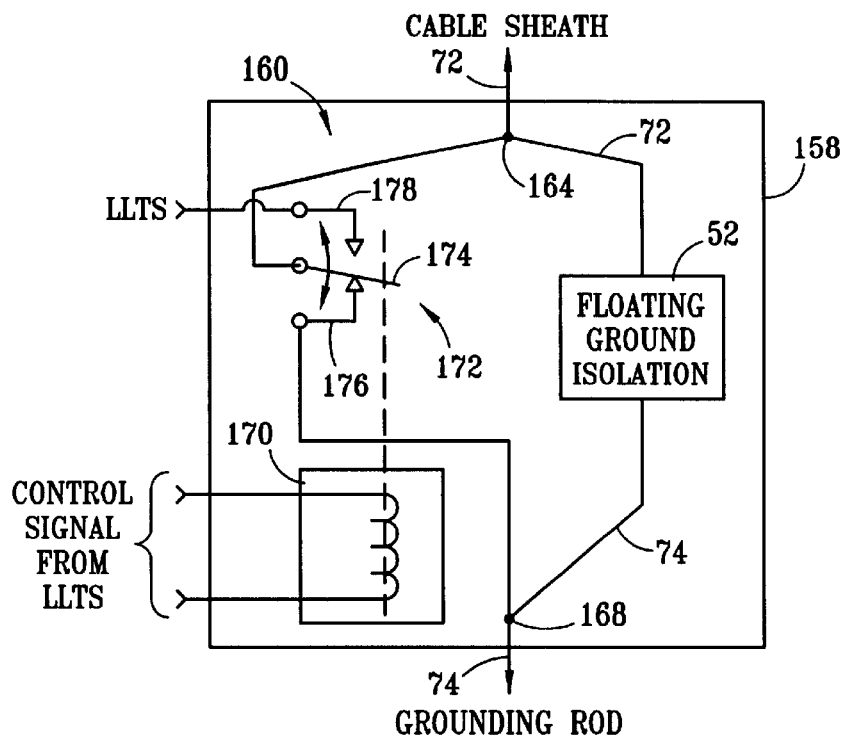
FIG. 9 is a schematic diagram illustrating a relay controlled floating ground circuit of the present invention.

Referring now to FIG. 9, there is shown a schematic diagram of a relay controlled floating ground circuit 158 of the present invention comprised of a relay switch circuit 160 connected in parallel with one of the floating ground isolators 52a–52f described in FIGS. 3–8. As mentioned earlier, in order for the cable locating system to function properly an LLTS 38 transmitting a cable locating signal must be coupled to the cable sheath at location 40. The relay switch circuit 160 functions to selectively connect the cable locating signal to the cable sheath 12 at location 40 when the LLTS 38 is operating. At all other times the relay switch circuit 160 connects a hardwired ground to the sheath 12 and the floating ground circuit 158 functions as a termination location 42.

The relay switch circuit 160 comprises a relay coil 170 actuating the relay switch 172. The relay switch includes a pole contact 174 connected to a first connection point 164 on the sheath connector lead 72 and a first throw contact 176 that is connected to a second connection point 168 on the ground connector lead 74. The relay switch further includes a second throw contact 178 that is externally connected to the LLTS 38 (FIG. 1). The relay switch 172 is illustrated in the non-energized state such that the first throw contact 176 is normally closed and the second throw contact 178 is normally open with respect to the pole contact 174. In the normal position, the cable sheath 12 is shunt connected through the pole contact 174 and the first throw contact 176 to the grounding rod 18. Actuation by the relay coil 170, in response to a control signal on line 182 from the LLTS 38, causes the pole contact 174 of the relay switch 172 to move from the first throw contact 176 to the second throw contact 178, thereby lifting the cable sheath 12 from ground and allowing the LLTS 38 to transmit the locating signal through the second throw contact onto the cable sheath 12.

As previously mentioned, the relay controlled floating ground circuit 158 is connected in parallel with the floating ground isolator 52. The surge suppression circuit 50 for the isolator 52a is preferably included in the circuit 158. Even though the cable sheath 12 is shunted to ground when the relay switch 172 is in the normal position, the shunt connection does not adversely affect the functional operation of the included isolator 52a. In fact, the isolator 52a operates to protect the relay switch 172 from damage caused by transient surges on the cable sheath. This is because the impedance of the activated surge suppression circuit 50 is less than the internal resistance of the relay switch circuit 160. Thus, the isolator 52a, not the ground connection through the relay switch 172, will conduct the transient surge to ground for dissipation.

Figure 10:
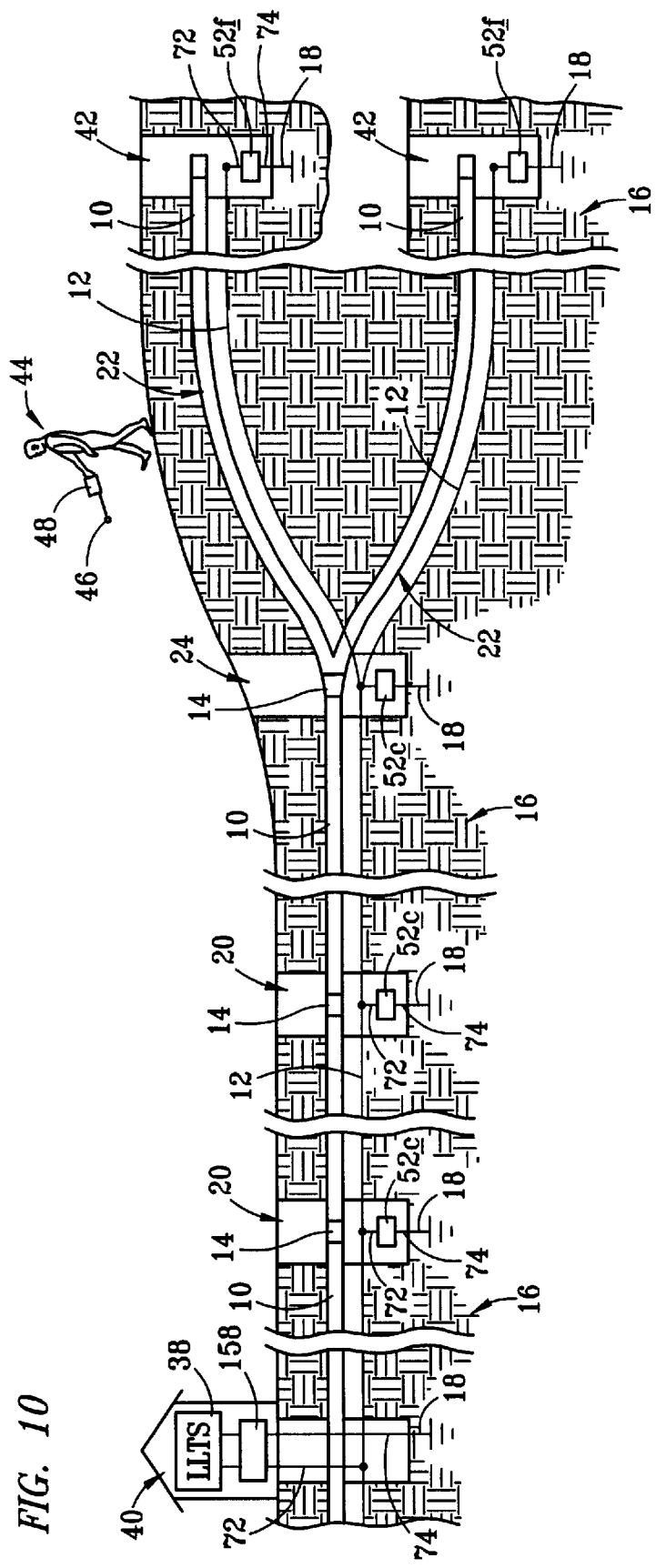
FIG. 10 illustrates a buried communications cable and the use of the circuits of the present invention for facilitating cable locating activities.

FIG. 10 illustrates the manner with which the various floating ground isolators 52a–52f and relay controlled floating ground circuit 158 are connected between the cable sheath 12 of a buried communications cable 10 and the grounding rods 18 to facilitate simultaneous protection from induced energy and operation of the conventional signal radiating cable locating technique. Floating ground isolators 52 are connected to the cable sheath 12 at each splice point 14 between the LLTS 38 and the long range termination location 42. The use of an isolator 52 of the present invention at each splice point 14 provides a floating ground that enables the locating signal transmitted by the LLTS 38 to propagate along the entire length of the communications cable 10 while simultaneously protecting the cable from annoying and/or damaging induced energy signals. It is preferred for the embodiment 52c to be used at each splice point 14. At the terminating location 42 of each spur 22, a selected floating ground isolator 52 with a side leg termination (one of the embodiments 52d–52f, and preferably embodiment 52f) is connected to the cable sheath 12.

To facilitate efficient connection of the LLTS 38 to the cable sheath 12, the relay controlled floating ground circuit 158 is used. When cable locating signals are transmitted onto the cable sheath 12 by the LLTS 38, a signal is also transmitted over line 182 to actuate the relay controlled floating ground circuit 158 and lift the ground at the transmitting LLTS 38 location 40. By using the isolators 52 of the present invention at each splice point, the ground connection with respect to the locating signal is lifted and the cable sheath functions as a radiating antenna. Locating personnel 44 using receiver 48 and antenna 46 may then detect the radiating locating signal at the earth's surface and pinpoint the location of the buried cable 10.

Furthermore, by connecting the isolator 52d–52f including a side leg termination circuit, the total impedance of the cable sheaths 12 for the spurs may be adjusted to compensate for differences in spur length. This insures that locating signals of sufficient strength for detection by the locating personnel 44 at the surface will propagate down each spur 22 to the terminating locations 42. It will be understood that because the relay controlled circuit 158 provides a ground connection when in the normal operating position, it alternatively may be connected to the cable sheath terminating locations 42 that are not located on spurs 22.

Figure 11:
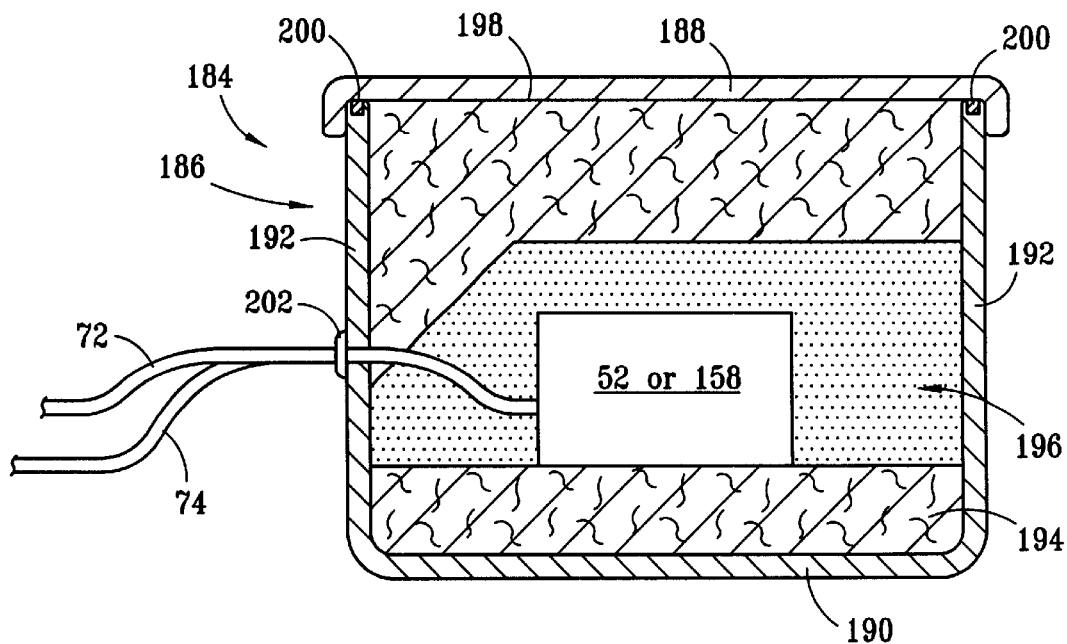
FIG. 11 is a cross-sectional view through a housing supporting the circuits of the present invention.

Referring now to FIG. 11, there is shown a cross-sectional view through a housing 184 enclosing a floating ground isolator 52 or relay controlled floating ground circuit 158 (each illustrated schematically as a box) of the present invention. The housing 184 comprises an enclosure 186 and a cover 188 made from moisture and corrosion resistant plastic material suitable for use in environmentally harsh areas (for example, underground). The enclosure 186 includes a base portion 190 and peripheral walls 192. Inside the enclosure, adjacent the base portion 190, there is a layer of an epoxy or polyamide based resin potting compound 194 that functions as both a heat barrier and a mounting means for securing the floating ground isolator 52 or relay controlled floating ground circuit 158 within the housing 184. The resin is sold under the tradename "HYSOL" by The Dexter Corporation, 211 Franklin Street, Olean, N.Y. 14760.

Surrounding the floating ground circuit 52 or relay floating ground circuit 158 is a layer of silica sand 196 for dissipating any heat generated by components of the isolator 52 or circuit 158 within the housing 184. The silica sand is crystalline silica (quartz) and is sold by U.S. Silica Company, P.O. Box 187, Berkeley Springs, W. Va. 25411. The remaining volume within the enclosure 186 comprises a second layer of the resin potting compound 198 that secures the silica sand and seals the floating ground isolator 52 or relay floating ground circuit 158.

A rubber grommet 202 defining an opening for receiving the sheath and ground connector leads, 72 and 74, respectively, (and the LLTS connection to the relay switch if necessary) is also provided. The silica sand layer 196 is shaped in the area around the grommet 202 such that the grommet opening will be sealed by the second potting compound layer 198 when dry. Before the second potting compound layer 198 dries, a gasket 200 is positioned about the top edge of the peripheral walls 192 and the cover 188 is installed. When the second potting compound layer 198 dries, the cover 188 will be permanently secured to the enclosure 186 with the compound layer and gasket 200 sealing the housing 184.

Although several embodiments of the present invention have been illustrated in the accompanying Drawings and described in the foregoing Detailed Description, it will be understood that the invention is not limited to the embodiments disclosed but is capable of numerous rearrangements and modifications of parts and elements without departing from the scope of the invention.

What is claimed is:

1. A floating ground circuit for a communications system susceptible to transient surges and periodic signals comprising:

a splice point for electrically coupling at least two cables of a communications system together, each cable of the communication system having a sheath for passing induced energy signals, said sheath of each cable at the splice point being electrically coupled together;

a surge suppressor having a first lead and a second lead, the first lead electrically connecting the surge suppressor to each conductive cable sheath electrically coupled at the splice point, the second lead electrically connecting the surge suppressor to ground for shunting transient surges having voltages exceeding a threshold value; and a filter connected in parallel with the surge suppressor for electrically coupling between each conductive sheath electrically coupled at the splice point and ground, the filter tuned for passing periodic signals having frequencies within a predetermined frequency range to ground without also passing to ground a desired cable locating periodic signal outside the predetermined frequency range and present on each conductive sheath of each communications cable located at the splice point.

2. A floating ground circuit in accordance with claim 1 wherein the surge suppressor comprises:

a metal oxide varistor having a first lead connected to each conductive sheath electrically coupled at the splice point and a second lead connected to ground; and a gas tube having a first lead connected to each conductive sheath electrically coupled at the splice point and a second lead connected to ground.

3. A floating ground circuit in accordance with claim 2 wherein the metal oxide varistor has a first threshold voltage and wherein the gas tube has a second threshold voltage slightly greater than the first threshold voltage selectively chosen to protect the metal oxide varistor from device failure.

4. A floating ground circuit in accordance with claim 1 wherein the filter comprises a capacitor and an inductor connected in series to form a bandpass filter, the series connected capacitor and inductor for coupling between each conductive sheath electrically coupled at the splice point and ground, the inductor and capacitor having component values selectively chosen to tune the filter to pass periodic signals within the predetermined frequency range.

5. A floating ground circuit in accordance with claim 1 wherein the filter is tuned for passing to ground induced energy from periodic signals having frequencies substantially at which power is transmitted and which are induced on each conductive sheath located at the splice point by power transmission lines in the vicinity of the communications system, without also passing to ground a desired periodic signal having a substantially higher frequency.

6. A floating ground circuit in accordance with claim 5 wherein the filter comprises an LC network.

7. A floating ground circuit in accordance with claim 6 further comprising adjustable impedance means for coupling between each conductive sheath of the communications cable electrically coupled at the splice point and ground for changing the impedance of each conductive sheath electrically coupled together at the splice point with respect to desired signals propagating thereon.

8. A floating ground circuit in accordance with claim 1 wherein the communications cable is a fiber optics communications cable.

9. A floating ground circuit in accordance with claim 1 wherein the ground is an earth ground.

10. A floating ground circuit for a conductive sheath of a communications cable susceptible to transient surges and periodic signals comprising:

a splice point for electrically coupling at least two cables of a communications system together, each cable of the communication system having a sheath for passing induced energy signals, said sheath of each cable at the splice point being electrically coupled together;

a surge suppressor having a first lead and a second lead, the first lead electrically connecting the surge suppressor to each conductive cable sheath electrically coupled at the splice point, the second lead electrically connecting the surge suppressor to ground for shunting transient surges having voltages exceeding a threshold value; and a filter connected in parallel with the surge suppressor for coupling between each conductive sheath electrically coupled at the splice point of the communications cable and ground, the filter tuned for passing to ground induced energy from periodic signals having frequencies substantially at which power is transmitted and which are induced on each conductive sheath located at the splice point by power transmission lines in the vicinity of the communications cable, without also passing to ground a desired periodic signal having a substantially higher frequency and present on each conductive sheath located at the splice point.

11. A floating ground circuit in accordance with claim 10 wherein the communications cable is a fiber optics communications cable.

12. A floating ground circuit in accordance with claim 10 wherein the filter comprises an LC network.

13. A floating ground circuit in accordance with claim 12 wherein the surge suppressor comprises:

a metal oxide varistor having a first lead connected to each conductive sheath electrically coupled at the splice point and a second lead connected to ground; and a gas tube having a first lead connected to each conductive sheath electrically coupled at the splice point and a second lead connected to ground.

14. A floating ground circuit in accordance with claim 13 wherein the metal oxide varistor has a first threshold voltage and wherein the gas tube has a second threshold voltage slightly greater than the first threshold voltage selectively chosen to protect the metal oxide varistor from device failure.

15. A floating ground circuit in accordance with claim 10 further comprising adjustable impedance means for coupling between each conductive sheath electrically coupled at the splice point and ground and for changing the impedance of each conductive sheath electrically coupled together at the splice point with respect to desired signals propagating thereon.

16. A floating ground circuit in accordance with claim 15 wherein the adjustable impedance means comprises:

a first impedance having a first lead and having a second lead for connecting to ground;

a second impedance having a first lead and having a second lead for connecting to ground; and switch means having a first operating position for connecting the first lead of the first impedance to each conductive sheath electrically coupled at the splice point, and a second operating position for connecting the first lead of the second impedance to each conductive sheath electrically coupled at the splice point.

17. A communications system comprising:

a splice point for connecting at least two communications cables, each cable having a first conductive member and a second conductive member for carrying desired signals and undesired signals, said second conductive members of each cable at the splice point being electrically coupled together;

a surge suppressor for coupling between each second conductive member electrically coupled together at the splice point and ground for shunting transient surges having voltages exceeding a threshold value; and a filter in parallel with the surge suppressor comprising a capacitor and inductor connected in series, the series connected capacitor and inductor having a first and a second lead, the first lead electrically connecting the filter to each second conductive member of each cable electrically coupled together at the splice point and the second lead electrically connecting the filter to the ground, the filter tuned to dissipate to ground undesired signals within a predetermined frequency range.

18. The communications system in accordance with claim 17 wherein the surge suppressor comprises:

a metal oxide varistor having a first lead connected to each second conductive member electrically coupled together at the splice point and a second lead connected to ground, the metal oxide varistor having a first threshold voltage; and a gas tube having a first lead connected to each second conductive member electrically coupled together at the splice point and a second lead connected to ground, the gas tube having a second threshold voltage slightly greater than the first threshold voltage selectively chosen to protect the metal oxide varistor from device failure.

19. A floating ground circuit in accordance with claim 17 wherein the ground is an earth ground.

20. A communications system comprising:

a splice point for connecting at least two fiber optics communications cables, each cable having a first conductive member and a second conductive member for carrying desired signals and undesired signals, said second conductive members of each cable at the splice point being electrically coupled together; and a filter having a first and a second lead, the first lead electrically connecting the filter to each second conductive member of each fiber optic cable electrically coupled together at the splice point and the second lead electrically connecting the filter to the ground, the filter tuned to dissipate to ground undesired signals within a predetermined frequency range.

21. A circuit for connection to a conductive sheath of a communication system subject to both desired and undesired induced signals, for locating a communication cable with less manpower comprising:

a splice point for electrically coupling at least two cables of a communications system together, each communication cable having a sheath for passing both desired and undesired induced energy signals along each sheath, said sheath of each communication cable being electrically coupled to the other at the splice point;

a first lead means for connection to each sheath electrically coupled at the splice point;

a second lead means for connection to ground;

floating ground means connected between the first and second lead means for shunting undesired induced signals to ground while simultaneously allowing the desired induced signals to continue propagation along each communication cable sheath passing through the splice point and along a spur; and adjustable impedance means connected between the first and second lead means for changing the impedance of each sheath electrically coupled at the splice point with respect to a cable locating signal propagating thereon to ground through the impedance means, wherein the adjustable impedance means comprises:

a first resistance having a first lead and having a second lead connected to the second lead means;

a second resistance having a first lead and having a second lead connected to the second lead means; and switch means for selectively connecting either the first lead of the first resistance or the first lead of the second resistance to the first lead means.

22. The circuit as in claim 21 further comprises a cable locating signal transmitted along each communication cable sheath.

23. The circuit as in claim 21 wherein the floating ground means includes surge suppression means for shunting transient surges having an induced voltage in excess of a predetermined threshold from each sheath electrically coupled at the splice point to ground for dissipation.

24. The circuit as in claim 23 wherein the surge suppression means comprises:

a metal oxide varistor having a first threshold voltage connected between the first and second lead means; and a gas tube having a second threshold voltage selected to be slightly greater than the first threshold voltage connected between the first and second lead means.

25. The circuit as in claim 21 wherein the floating ground means includes filter means approximately tuned to the frequency of a periodic interference signal for shunting the periodic interference signal to ground for dissipation.

26. The circuit as in claim 25 wherein the filter means comprises a capacitor and an inductor connected in series with each other between the first and second lead means to form a band-pass filter having a frequency response for passing periodic signals on each sheath electrically coupled at the splice point within a predetermined frequency range to ground.

27. The circuit as in claim 26 further including surge suppression means for shunting transient surges having an induced voltage in excess of a predetermined threshold from each sheath electrically coupled at the splice point to ground for dissipation.

28. The circuit as in claim 21 wherein the floating ground means further includes selective ground means having an inactivated position for connecting the first lead means to the second lead means and an activated position for disconnecting the connection between the first and second lead means.

29. The circuit as in claim 28 wherein the activated position for the selective grounding means further functions for connecting the first lead means to a signal source to induce a desired signal on each sheath electrically coupled at the splice point.

30. A floating ground circuit for a communications cable sheath susceptible to transient surges and periodic signals comprising:
- a splice point for electrically coupling at least two cable sheaths together;
- a surge suppressor for coupling between the splice point and ground for shunting transient surges having voltages exceeding a threshold value; and
- a filter parallel with the surge suppressor for coupling between the splice point and ground, tuned for passing periodic signals at frequencies substantially at which power is transmitted which are induced on each sheath electrically coupled at the splice point by power transmission line in the vicinity of the communication cable, without also passing a desired signal at a substantially higher frequency.

31. The floating ground circuit as in claim 30 wherein the surge suppressor comprises:
- a metal oxide varistor having a first lead connected to the splice point and a second lead connected to ground; and
- a gas tube having a first lead connected to the splice point and a second lead connected to ground.

32. The floating ground circuit as in claim 31 wherein the metal oxide varistor has a first threshold voltage and wherein the gas tube has a second threshold voltage slightly greater than the first threshold voltage selectively chosen to protect the metal oxide varistor from device failure.

33. The floating ground circuit as in claim 30 further including adjustable impedance means connected between the splice point and ground for changing the impedance of each cable sheath electrically coupled at the splice point with respect to desired signals propagating thereon.

34. The floating ground circuit as in claim 33 wherein the adjustable impedance means comprises:
- a first impedance having a first lead and having a second lead connected to ground;
- a second impedance having a first lead and having a second lead connected to ground; and
- switch means having a first operating position for connecting the first lead of the first impedance to the splice point, and a second operating position for connecting the first lead of the second impedance to the splice point.

35. A communication system comprising:
- a splice point for electrically coupling at least two cables of a communications system together, each cable of the communication system having a conductive sheath for passing induced energy signals, said sheath of each cable at the splice point being electrically coupled together; and
- a surge suppressor for shunting transient surges having an induced voltage from each sheath electrically coupled at the splice point to the ground for dissipation, the surge suppressor having a metal oxide varistor, the metal oxide varistor having a first side and a second side, said first side being directly connected to each sheath electrically coupled at the splice point and said second side being directly connected to ground and a first threshold voltage for shunting a transient surge on each sheath electrically coupled at the splice point in excess of the first threshold voltage, and a gas tube connected between each sheath electrically coupled at the splice point and ground, the gas tube having a second threshold voltage selected to be slightly greater than the first threshold voltage to protect the metal oxide varistor from device failure for shunting a transient surge on each sheath located at the splice point in excess of the second threshold voltage.

36. A communications system comprising:
- a splice point for electrically coupling at least two cables of a communications system together, each cable of the communication system having a conductive sheath for passing induced energy signals, said sheath of each cable at the splice point being electrically coupled together; and
- a band-pass filter tuned to ground harmful, high voltage periodic signals substantially at frequencies at which power is transmitted which are induced on each sheath electrically coupled at the splice point by power transmission lines in close proximity thereto without also substantially passing to desirable signals at frequencies substantially higher than frequencies at which power is transmitted which are propagating along each cable sheath electrically coupled at the splice point.

37. A floating ground isolating circuit for a communications cable system susceptible to transient surges and having a main cable and at least one side leg cable, the floating ground isolating circuit comprising:
- a surge suppressor for coupling between a conductive sheath of a communications cable and ground for shunting transient surges on the conductive sheath having voltages exceeding a threshold value; and
- impedance means for creating a voltage drop when passing a cable locating signal frequency to ground, the impedance means for coupling between the conductive sheath of the communications cable and ground, in parallel with the surge suppressor.

38. The circuit of claim 37 wherein the means for impeding includes a resistor.

39. The floating ground isolating circuit of claim 37 is connected to a conductive sheath of a communications cable spur at a terminating end thereof opposite an end which is connected to a main communications cable.

40. A floating ground isolating circuit for a communications cable system susceptible to transient surges, the system having a main cable and at one cable spur; the floating ground isolating circuit comprising:
- a surge suppressor for connecting between a first conductive member of a main communications cable and ground for shunting transient surges having voltages exceeding a threshold value;
- a filter connected in parallel with the surge suppressor for coupling between the the first conductive member of the communications cable and ground and tuned for passing to ground induced energy from periodic signals having frequencies substantially at which power is transmitted and which are induced on the first conductive member by power transmission lines in the vicinity of the communications cable, without also passing to ground a desired periodic signal having a substantially higher frequency and present on the first conductive member; and a plurality of impedance means, each impedance means creating a voltage drop when passing a desirable signal and having first and second ends, the first end of each impedance means connected to the first conductive member and the second end of each impedance means terminating in a connection point for coupling to a second conductive member of a communication cable spur for enabling a cable locating signal to propagate along the communications cable spur and the main cable.

41. The floating ground isolating circuit of claim 40 connected to the first conductive member of the main communications cable and the second conductive member of the communication cable spur coupled to one of the plurality of connection points for transmitting the cable locating signal along the spur.

42. The floating ground isolating circuit of claim 40 in combination with the main communications cable and at least one communication cable spur having adjacent thereto a tracer wire connected at one end to one of the plurality of connection points for transmitting the cable locating signal.

43. The floating ground isolating circuit of claim 40 wherein the surge suppressor and the plurality of impedance means are packaged in a single enclosure.

44. The floating ground isolating circuit of claim 40 wherein each of the plurality of impedance means includes a resistor.

45. A communications system comprising:
- a splice point for connecting at least two communications cables, each cable having two conductive members, a first conductive member and a conductive cable sheath member, for carrying desired signals and undesired signals, said cable sheath member of each cable at the splice point being electrically coupled together; and
- a filter having a first and a second lead, the first lead electrically connecting the filter to each cable sheath member of each cable electrically coupled together at the splice point and the second lead electrically connecting the filter to the ground, the filter tuned to dissipate to ground undesired signals within a predetermined frequency range.

46. A floating ground circuit for a communications cable susceptible to transient surges and periodic signals comprising:
- a splice point for electrically coupling at least two cables of a communications system together, the cables of the communication system having a conductive sheath for passing induced energy signals, said sheath of each cable at the splice point being electrically coupled together;
- a surge suppressor for coupling between each conductive cable sheath of a communications cable electrically coupled at the splice point and ground for shunting transient surges having voltages exceeding a threshold value;
- a filter in parallel with the surge suppressor for coupling between each conductive cable sheath of the communications cable electrically coupled at the splice point and ground, tuned for passing periodic signals having frequencies within a predetermined frequency range to ground, wherein the filter comprises an LC network; and
- an adjustable impedance means for coupling between each conductive cable sheath of the communications cable electrically coupled at the splice point and ground for changing the impedance of each conductive cable sheath coupled together at the splice point with respect to desired signals propagating thereon.

47. A floating ground circuit for a conductive cable sheath of a communications cable susceptible to transient surges and periodic signals comprising:
- a splice point for electrically coupling at least two cables of a communications system together, the cables of the communication system having a conductive sheath for passing induced energy signals, said sheath of each cable at the splice point being electrically coupled together;
- a surge suppressor for coupling between the splice point and ground for shunting transient surges having voltages exceeding a threshold value;
- a filter connected in parallel with the surge suppressor for coupling between the splice point and ground, tuned for passing to ground induced energy from periodic signals having frequencies substantially at which power is transmitted and which are induced on each cable sheath of the communication system by power transmission lines in the vicinity of the communications cable, without also passing to ground a desired periodic signal having a substantially higher frequency and present on the splice point;
- an impedance means for coupling between the splice point and ground and for changing the impedance of each cable sheath electrically coupled together at the splice point with respect to desired signals propagating thereon.

\* \* \* \* \*

UNITED STATES PATENT AND TRADEMARK OFFICE
CERTIFICATE OF CORRECTION

PATENT NO. : 6,292,344 B1  Page 1 of 1
DATED : September 18, 2001
INVENTOR(S) : Glaser et al.

It is certified that error appears in the above-identified patent and that said Letters Patent is hereby corrected as shown below:

<u>Column 17,</u>
Line 2, delete "ground" and insert -- grounding --

Signed and Sealed this

Nineteenth Day of March, 2002

Attest:

Attesting Officer

JAMES E. ROGAN
*Director of the United States Patent and Trademark Office*